United States Patent [19]

Devletian et al.

[11] 4,429,207

[45] Jan. 31, 1984

[54] METHOD FOR WELDING RAILROAD RAILS AND MEANS THEREFOR

[75] Inventors: Jack H. Devletian, Portland; William E. Wood; Robert B. Turpin, both of Hillsboro; Milton R. Scholl, Aloha, all of Oreg.

[73] Assignee: Southern Pacific Transportation Company, San Francisco, Calif.

[21] Appl. No.: 335,812

[22] Filed: Dec. 30, 1981

[51] Int. Cl.³ ............................................. B23K 25/00
[52] U.S. Cl. ................................. 219/73.1; 219/137 R
[58] Field of Search .................. 219/73.1, 73.11, 73.2, 219/73.21, 76.1, 76.14, 72, 126, 145.1, 145.23, 53, 54, 73, 137 R; 104/15

[56] References Cited

U.S. PATENT DOCUMENTS

| 3,171,013 | 2/1965 | Danhier | 219/137 R |
| 3,192,356 | 6/1965 | Shrubsall | 219/73.1 |
| 3,517,155 | 6/1970 | Mantel et al. | 219/73.2 X |

FOREIGN PATENT DOCUMENTS 518426 of 1926 Australia ........................ 219/145.1

52-62144 5/1977 Japan ............................... 219/73.1

*Primary Examiner*—Roy N. Envall, Jr.
*Assistant Examiner*—Catherine M. Sigda
*Attorney, Agent, or Firm*—Freilich, Hornbaker, Rosen & Fernandez

[57] ABSTRACT

A method for electroslag welding of railroad rails under field conditions employs a special mold bottom member and a special guide tube structure. The mold bottom member includes a metallic insert which is supported by heat-insulating means, e.g. ceramic material in a cavity in a bottom copper block. The ceramic effectively heat insulates the insert from the copper block so when arcing takes place at the start of the welding, the heat is retained by the insert, which forms part of the weld. The guide tube structure is flared toward the bottom and guides two continuously fed electrodes. The structure includes wing-like members near its bottom end. The bottom of the structure is designed wth sharp corners, so that when arcing takes place some of the guide structure metal melts to form a uniform layer of molten metal, which aids in the melting of flux into a slug bath of uniformly distributed temperature.

16 Claims, 11 Drawing Figures

FIG. 6

METHOD FOR WELDING RAILROAD RAILS AND MEANS THEREFOR

FIELD OF THE INVENTION

The present invention relates to railroad welding and, more particularly, to a new improved method and system for railroad rail welding under field conditions.

DESCRIPTION OF THE PRIOR ART

The need for welding together ends of adjacent rails of railroads is well known. Since the welding has to be performed under field conditions, the process has to be relatively simple to minimize the level of required operation skill. Also, the equipment has to be easily portable and the process reasonably brief, so as to minimize rail traffic disruption, all without sacrificing the quality of the weld. Also, the process has to be one which can be performed under varying atmospheric conditions, such as in cold or warm weather.

Although welding methods and systems exist which are capable of producing high quality welds for rails in other than field conditions, e.g., in a plant shop, such methods and systems are not adequate for producing high quality welds under field conditions. At present, there is only one field-welding process which is widely known as the Thermit welding process. As is known, in this process a filler metal, formulated to match rail microstructure and properties, is used.

Although the Thermit process has been used, it does not produce high quality sound welds which are reproducible. A high quality sound weld is one with properties equivalent to or better than those of the welded rails, and without entrapped quantities of non-metallic inclusions and evolved gases in the weld, and particularly in the weld fusion zones with the rails. Welds, performed with the Thermit process, are susceptible to in-service failures more frequently than any other portion of the rail. Another disadvantage of the known prior art method is its inadaptability to produce in-field high quality sound welds of rails with variable metallic properties, such as rails with hardened heads.

In the late 60's, two Russian articles appeared in the literature. They include "Electroslag Welding of Crane Rails", by L. N. Kopetman et al., Svar. Proiz, No. 4, 1967, pp. 32-34, and "The Semi-Automatic Welding Electroslag Welding of Rail", Avt. Svarka, No. 3, 1966, p. 53. A careful reading of these articles fails to teach one familiar with the art to practice the methods disclosed therein. A need therefore exists for a new improved process and system for welding rails in the field to produce a high quality sound weld.

OBJECTS AND SUMMARY OF THE INVENTION

It is a primary object of the present invention to provide a new process for field welding railroad rails so as to produce high quality sound welds.

Another object of the present invention is to provide a new welding system for producing high quality sound welds of railroad rails under field conditions in a reasonably short time so as to minimize traffic disruption.

These and other objects of the invention are achieved by employing modified electroslag welding (ESW) techniques with novel and unique mold members for the production of high quality sound rail welds under field conditions. In such conditions, the rails cannot be turned upside down, and therefore any welding has to start at the rail base, which as is known, is long and relatively thin when viewed in cross section. Extending from the rail base is the rail web which supports the rail head. The novel mold includes a novel bottom member with special inserts so as to enable the bottom member to be removed easily after the welding operation is completed, without having to grind or chisel the bottom member from the weld and/or the bases of the rails, a task which is not practical in the in-field rail welding.

The novel bottom member is designed, as will be explained hereafter in detail, to facilitate arc starting and run-in to promote complete fusion of the weld with the rail bases, and the elimination of non-metallic inclusions and any gaseous inclusions at the bottom of the weld, thus insuring a high quality weld start. Due to the unique cross section of the rails, a guide tube of novel design is used so as to provide proper amounts of filler metal as a function of the rail cross section and provide proper heat distribution. Special steps are performed at the end of the weld process to prevent slag entrapment and any porosity in the top part of weld, below the top of the heads of the welded rails.

The novel features of the invention are set forth with particularity in the appended claims. The invention will be best understood from the following description when read in conjunction with the accompanying drawings.

DETAILED DESCRIPTION OF THE PREFERRED EMBODIMENTS

Before detailing the novel features of the present invention, a typical electroslag welding (ESW) process will be described. Basically, in such a process, fusion is achieved by resistance heating an electrically conductive slag bath by continuously feeding in a consumable high-current-carrying electrode. To initiate the process, flux at the bottom of the mold is converted to a slag bath as a result of arcing between the electrode, which extends into the flux, and the mold bottom. The slag bath is maintained at a temperature and depth sufficient to melt the electrode and the electrode guide, which is used to guide the electrode into the slag bath, and which melts therein, as well as to melt some of rail base metal to produce adequate fusion. The melted electrode and guide form a molten bath below the slag bath. The metal at the bottom of the molten bath hardens as it cools to form the weld. Thus, in such a process, the weld is formed by metal which hardens at the bottom of the molten bath on top of which the slag bath is present.

Although ESW has been used for single pass vertical welding of heavy section, e.g. over ¾ inch thick steel plates, the conventional ESW process cannot be used to produce high-quality sound welds of rails under field conditions. This is due to the fact that in a conventional ESW operation, molten metal hardens and fuses to the mold's bottom member. Thus, after the welding is completed, the mold's bottom member has to be sheared off. This cannot be done when welding rails in the field, since the rails cannot be turned upside down. Also, as a result of the highly variable cross section of the rails, inadequate fusion and/or inadequate rate of metal feed result when a conventional ESW process is used. Furthermore, when a conventional ESW process is employed quite often gaseous inclusions and other impurities as well as some porosity are present at the bottom of the weld, thus, resulting in less than the desired high quality sound rail weld.

Figure 1:
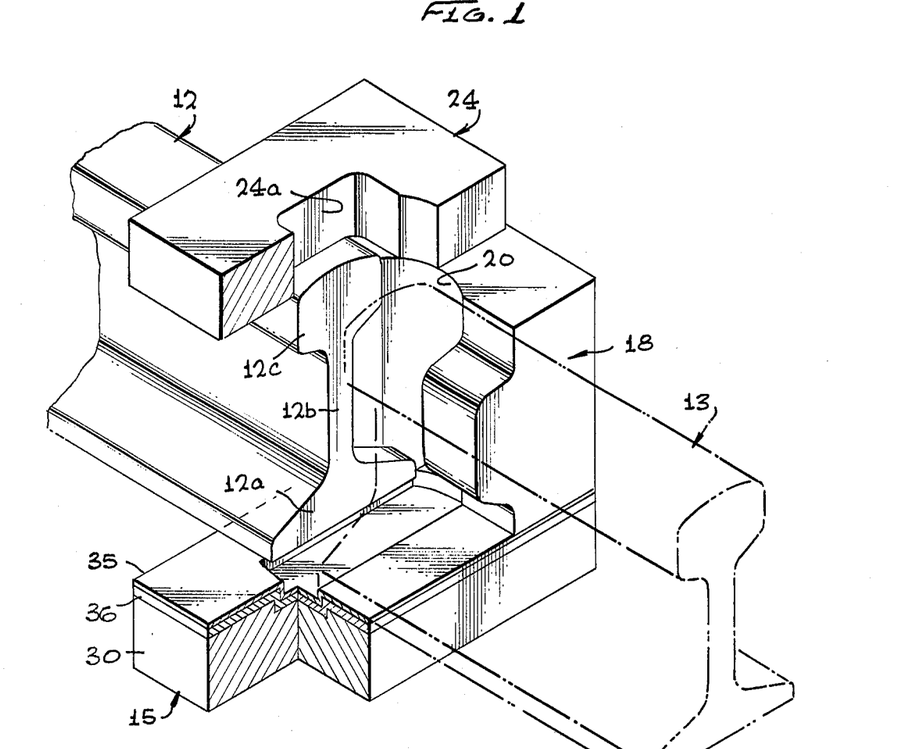
FIG. 1 is an isometric view of rails and parts of a mold in accordance with the present invention.

These and other objects of the present invention are achieved by the novel process and means of the present invention, which will be explained in conjunction with FIGS. 1-2. FIG. 1 is a perspective view of a pair of rails 12 and 13 to be welded in accordance with the present invention. To highlight various features and parts of the mold, rail 13 is shown in dashed lines. In accordance with the present invention, the mold members include a unique bottom member 15 which will be described in detail. The ends of rails 12 and 13, which are to be welded together, rest on member 15. Also, resting thereon are a pair of copper shoes, only one of which is shown, and designated by numeral 18. The other shoe is identical. Shoe 18 extends from the base 12a of rail 12 along the rail's web 12b to the top of the rail head 12c. The shoe 18, as well as the other shoe (not shown) are contoured to abut the rails on either side as well as to form a cavity which is wider than the rail's width and which is designated by 20. It is cavity 20 which is filled by the process of the present invention.

Figure 2:
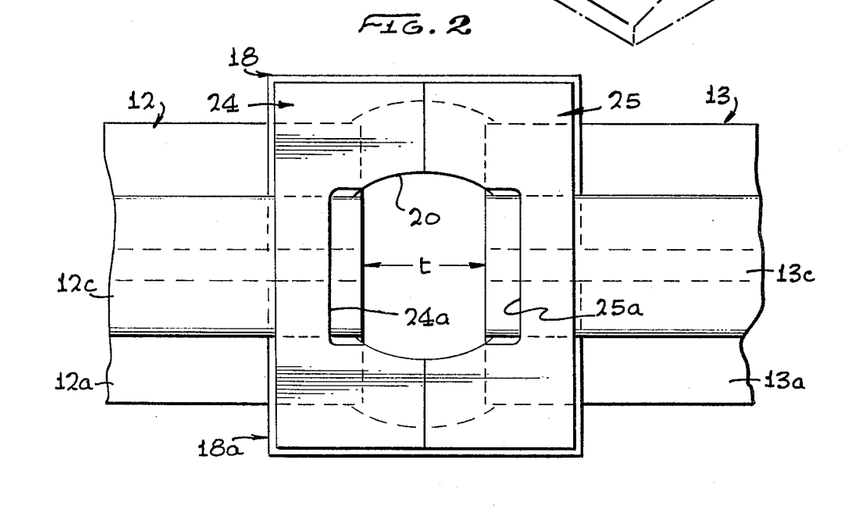
FIG. 2 is essentially a top view of the mold and the mold cavity.
Figure 3:
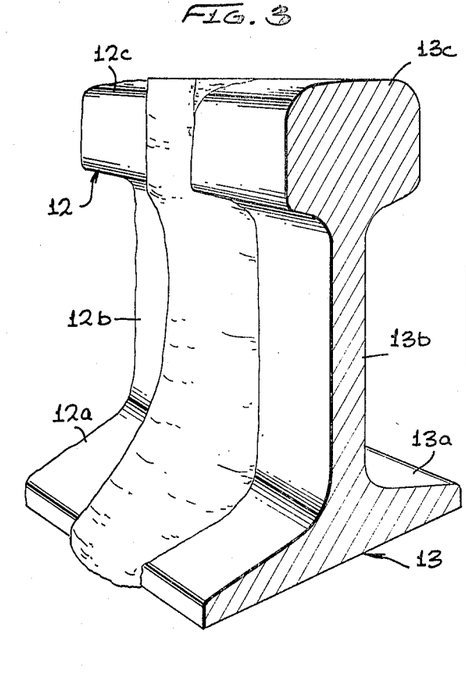
FIG. 3 is an isometric view of two welded rails.

This aspect of the invention may best be highlighted by FIG. 2, which is a top view of shoe 18, its twin shoe 18a on the opposite side of the rails 12 and 13. As seen from FIG. 2, the oppositely-positioned shoes 18 and 18a are contoured to abut the sides of the rails, from their bases 12a and 13a up to their heads 12c and 13c. At the space between the rails, designated t, the shoes are contoured to form a cavity 20 whose volume is greater than that between the two rails. It is cavity 20 in which welding takes place so that when the weld is finished, it extends slightly beyond the rails' sides as shown in FIG. 3. (Note: FIG. 3 is the picture).

In addition to the aforementioned parts of the mold, the mold includes two top members 24 and 25. Only top member 24 is shown in FIG. 1. Member 24 rests on rail 12 and shoes 18 and 18a, while its twin top members 24 rests on rail 13 and the shoes 18 and 18a. Each of these top members is contoured with a concave face, the two faces being designated 24a and 25a, so that, even though in operation the two top members abut one another, a cavity is formed above cavity 20 and more importantly above the heads 12c and 13c of the two rails. As will be explained hereafter in detail, the function of the two top members 24 and 25 and the cavity formed by them is to provide for run-out at the end of the welding process. Briefly, the function of these top members 24 and 25 and the top cavity, formed thereby is to provide a space for the slag bath and some molten metal to rise above the tops of the rails. When reaching the level, the process is terminated and the top members are separated, thus enabling the slag to run off, without any of the slag cavitating into the molten metal, which may harden to form part of the weld below the tops of the rails.

When the slag is permitted to run-off, the molten metal which was below the slag bath is sufficiently high above the rails so that none of the slag which may cavitate into the molten metal reaches any of the metal which hardens below the tops of the rails. Thus, the actual weld, at least up to the tops of the rails is free of any contamination slag, or other impurities. Any metal which hardens above the rails is sheared off, such as by grinding to form a weld with a flat top, as shown in FIG. 3.

As previously pointed out, a conventional ESW process cannot be used to produce high quality welds of rails under field conditions. One of the reasons is that in such a process hardened metal at the weld bottom tends to fuse to the mold's bottom member which is of copper. After welding, the latter is separated from the weld. As a result of the fusion, some copper sufficient to contaminate the weld bottom is present. Thus, other than a perfect weld is produced. Also, it is sometimes difficult to remove the bottom members from below the rails, without turning the rails upside down, which is unacceptable for field operation.

Another very important reason why a conventional ESW process cannot be used to produce high quality welds, i.e., welds without entrapped inclusions to porosity, hereafter also referred to as impurities such as is required for rails is due to the fact that in a conventional ESW process, the initial arc is produced between the consumable guided electrode, which is generally at a high voltage ($+V$) and the mold's bottom member which is at a low voltage, e.g. ground. The bottom member, which is typically of the same material as the parts to be welded, e.g., steel in case of railroad rails, has a large mass. Thus, in addition to being electrically conductive, it is also a good heat conductor. Consequently, the total heat produced by the arc dissipates in the mold's bottom member of the large mass, and therefore the total heat is insufficient to raise the bottom member significantly. As a result any impurities at the bottom of the mold do not reach their vaporization temperatures and therefore remain entrapped at the bottom of the finished weld. Consequently, the finished weld has entrapped impurities which effect the soundness of the weld. They are often present at fusion regions between the weld and the rails' ends. Furthermore, due to the great heat dissipation in the bottom copper or steel member electrode metal tends to melt only at the arcing region rather than across the weld's width. Consequently, if a conventional ESW process with a conventional bottom copper member were used, a weld with an imperfect, i.e. non-uniform bottom region would result at the bases of the rails. Such a weld is unacceptable when high quality sound welds are required.

Figure 4:
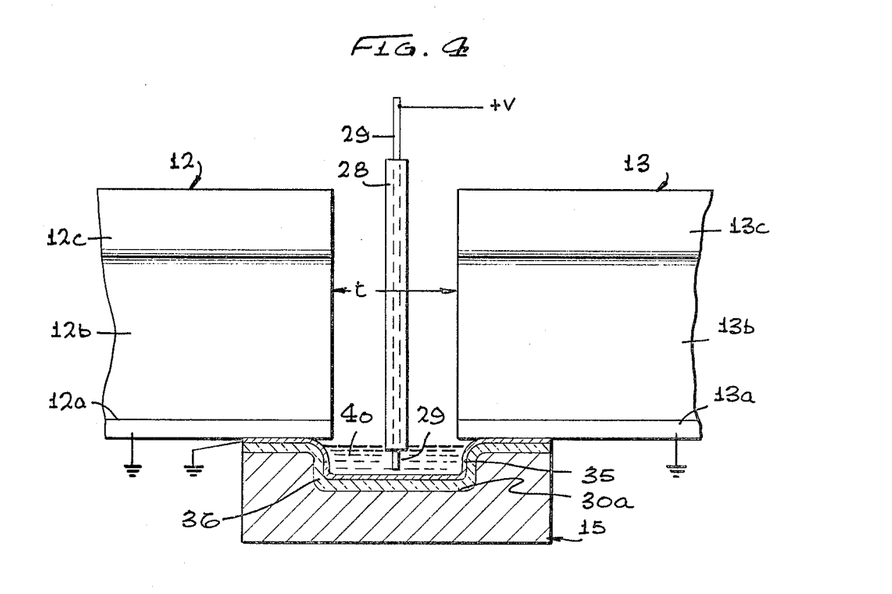
FIG. 4 is a simplified view showing the novel bottom member in cross section.

These prior art limitations and disadvantages are eliminated by a novel mold bottom member and by the starting steps of the process of the present invention. These aspects will be described in connection with FIG. 1 and FIG. 4, wherein the bottom member is designated by numeral 15. FIG. 4 is essentially a simplified side view-across the weld region of the two rails with a simplified guide tube 28 and electrode 29, and without shoes 18 and 18a and top members 24 and 25.

Bottom member 15 is shown in cross section. The bottom member includes a bottom block 30 of matter, such as copper. However, unlike the prior art, the bottom block 30 is shaped to form an elongated cavity or recess 30a. Accommodated in recess 30a is a trough-shaped insert 35 which is separated from the bottom block 30 by heat-insulating matter, such as a ceramic layer 36. The trough of insert 35 is slightly longer than the bases of the rails 12 and 13, and its width slightly greater than the space between the rails, which rest on insert 35. Thus, in accordance with the present invention, the rails rest on insert 35, rather than on the larger bottom block 30.

The insert 35 is typically made of steel and its trough acts as the bottom of the space to be occupied by the weld. As in the prior art, the rails and the mold are at one potential, e.g., ground, and the continuously fed electrode and its guide are at a high voltage, as indicated by $+V$ in FIG. 4. The insert 35 is also at ground potential. When welding starts, i.e., when $+V$ is applied to the electrode 29, since it typically touches to the insert 35, due to the voltage difference, arcing takes place. The arcing heats up the insert 35, which in addition to being an electrical conductor is also a good heat conductor. Thus, the insert heats up. Since its total mass is small and it is heat-isolated from block 30 by ceramic layer 36, its temperature rises very significantly. As a result, any vaporizable impurities at the bottom vaporize and escape out of the weld mold. This is most significant since it eliminates the presence of any impurities in the finished weld. Also, due to the high temperature of the insert, the molten metal from the continuously fed electrode spreads out evenly over the entire trough of the insert to thereby produce a uniform bottom for the weld, when the metal hardens. Also, when flux 40 is poured in, it melts quickly to form the slag bath. Once the slag bath is formed, the continuously fed electrode 29 and its guide melt in the slag bath to provide the molten metal for the weld.

It should be pointed out that the insert melts completely and becomes part of the weld metal, forming the bottom part of the weld. However, since its trough is below the bases of the rails, the weld metal extends to below the rails' bases. Thus, the presence of the insert in no way affects the fusion of the rails' bases with the weld metal, resulting in a high quality weld at the bottom, free of impurities.

As to ceramic layer 36 and the bottom block 30, after the welding is completed, they are easily separable from the insert, since no hardened metal comes in contact with them. This is most significant since the removal of the ceramic layer and the bottom block 30 is achievable without any requirement for grinding or like operation. Thus, the process of the present invention can be performed under field conditions, with the rails in their standard upright position.

Figure 4A:
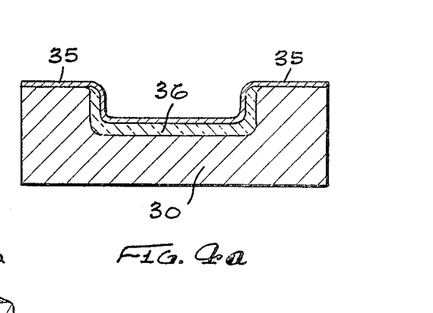
FIG. 4a is a cross sectional view of another embodiment of the novel member.

Although in FIGS. 1 and 4 the insert 35 is shown to be totally separated from the bottom member 30 by the ceramic layer 36, the invention is not limited to such an arrangement. If desired, the ceramic layer 36 may separate the insert 35 from block 30 only at the trough region of the former, while the rest of the insert is in contact with block 30, as shown in cross section in FIG. 4a. This in no way affects the above-described advantages which are realized with the novel arrangement as long as the trough portion of insert 35 is heat insulated by layer 36. The latter is referred to as ceramic layer 36, although other heat-insulating matter may be used. In one embodiment actually reduced to practice, the ceramic layer was formed from small pieces of ceramic which are commercially available, such as from KUDER of Philadelphia, Pa. The layer 36 whether of ceramic or other heat-insulating matter, may be formed with a trough from a single piece of material.

Although the primary function of the bottom block 30 is to support the insert 35 whereat welding starts, it may serve one additional important function, particularly when the insert 35 is in contact therewith. Under field conditions, the novel process of the present invention may have to be practiced under highly varying ambient atmospheric conditions, namely in very cold as well as in very hot locations. It has been found that the starting conditions of the process are more easily standardized by preheating the entire portion of the assembly, such as the bases of the rails, the insert 35 and the starting block 30 to a particular temperature range, e.g., 400° F. to 600° F.

Figures 5, 5A, 6:
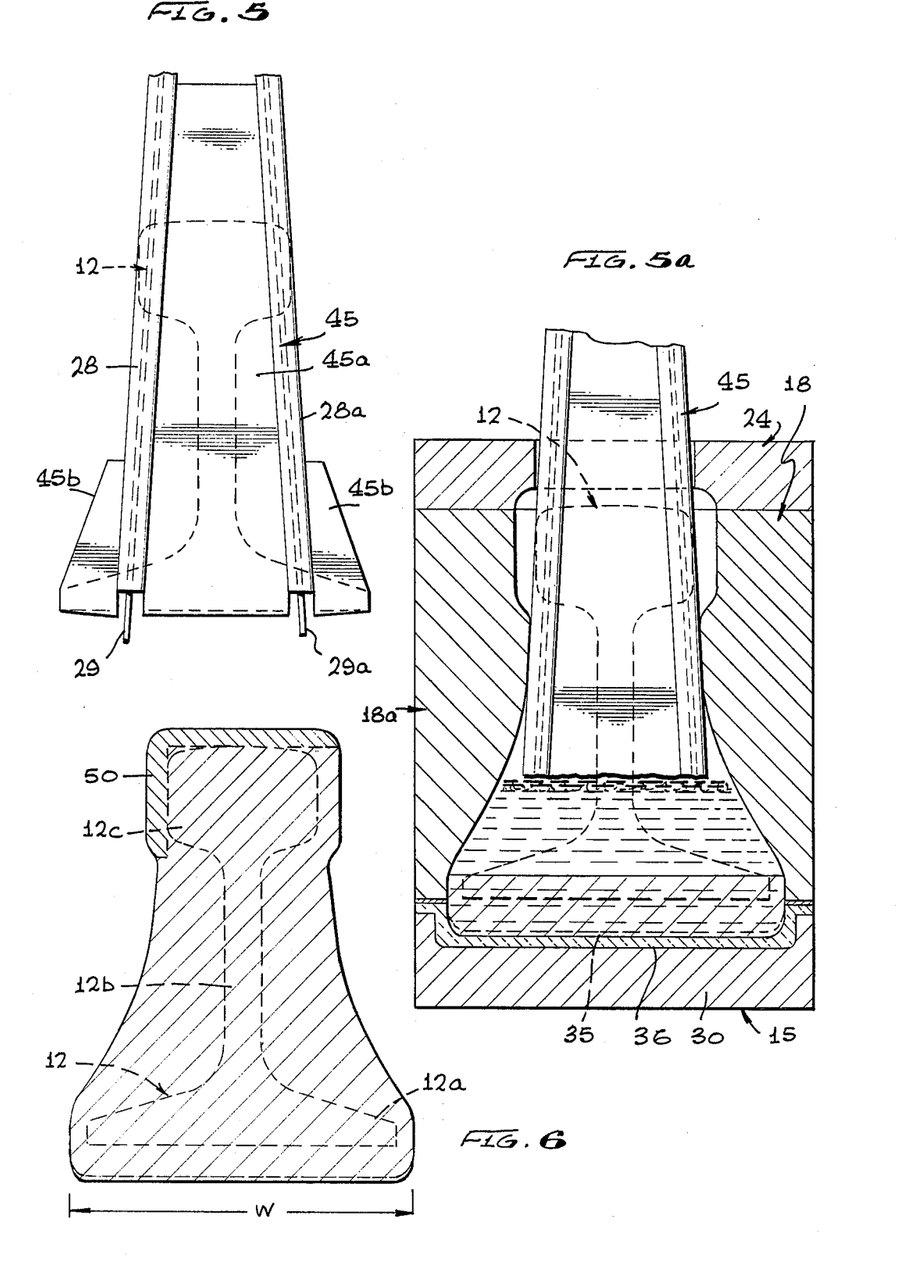
FIG. 5 is a side view of one embodiment of a guide tube structure.
FIG. 5a is a diagramic cross sectional view of the mold during the welding process.
FIGS. 6 and 7 are cross sectional views of welds of different shapes.

Attention is now directed to FIG. 5, which is a front view of one embodiment of a novel consumable electrode guiding and filler metal structure 45, hereafter simply referred to as the consumable guide structure, which is particularly designed for producing high quality welds of rails. In FIG. 5 the consumable guide structure 45 is shown in its position in the weld mold, while one of the rail's ends is shown in dashed lines. As is appreciated, due to the highly varying cross section of each rail, which varies from a long thin base, through a narrow tall web and a substantially thick rail head, a conventional ESW guide tube cannot be used, since such a guide tube would not provide adequate varying, yet proper, amounts of filler metal for the weld formation. In accordance with the present invention this is achieved with structure 45.

The structure 45 essentially consists of one or more metal plates 45a with two guide tubes designated 28 and 28a on either side thereof. It is these tubes through which the consumable electrodes at $+V$ are continuously fed. As seen from FIG. 5, the plate with the guides flare out toward the bottom of the structure to increase the spacing between the electrodes, designated 29 and 29a. In order to provide sufficient filler metal at the bottom of the weld, to ensure proper welding at the relatively long bases of the rails, the structure 45 includes consumable metal pieces 45b which resemble wings on either side of the guide tubes 28 and 28a.

In operation, structure 45 is permanently clamped so that the tips of electrodes 29 and 29a are just above the insert 35. Then, as the process is initiated by applying $+V$ to the electrodes arcing takes place, as heretofore described. Once the slag bath is formed of the molten flux, the bottom part of structure 45 melt continues to provide filler metal with the electrodes being continuously fed to provide essential heating of the slag bath to continue the melting of the structure 45, thus providing adequate amounts of filler metal for the weld. In fact, all the various parts of the structure 45 melt to provide filler metal. By properly designing the shape and thickness of the structure 45 the rate of filler metal which is being provided is controlled as well as the heat distribution due to the spacings between the electrodes.

Quite often rails which are typically formed of steel include various alloys such as those used to produce rails with hardened heads. In accordance with the present invention, such rails can be welded with great success by inserting at the proper locations in structure 45 pieces of alloys to match certain chosen properties of the rails, e.g. hardness, microstructure and the like.

Although the integrity of a rail base as well as its web is important, preventing any possibility of damage to the rail head is of particular significance. Thus, in accordance with the present invention the upper part, e.g., ⅓ of shoes 18 and 18a (see FIG. 1) are cooled such as by water in order to control the temperatures of the slag bath and that of the molten metal as they pass the heads to ensure proper fusion, while preventing any overheating of the head or shoes which can result in permanent damage. If desired, cooling may be achieved by shoes of larger mass near the heads' region so as to absorb more heat, and thereby eliminate the need for water cooling.

It should be pointed out that the metal of the structure 45 as well as the guide tube start to melt as they come in contact with the slag bath, due to the high temperature of the slag bath, e.g. 3800° F. The electrodes extend in to the slag bath and melt therein. The relatively wide structure 45 serves to distribute the power across the width of the weld.

It should also be pointed out that as the welding process proceeds it is the slag bath which rises first, thus coating the colder surfaces of shoes 18 and 18a, which, as previously pointed out, are made of copper. Thus, the finished weld has an outer coating of slag, thereby facilitating the removal of the shoes, and to some degree protecting the weld from oxidation. A diagramatic cross-sectional view of the mold during the process is shown in FIG. 5a.

Attention is now directed to FIG. 6 which is effectively a cross-sectional view of the weld with the periphery of the end of one of the welded rails, e.g., rail 12, shown in dashed line. Basically, the insert 35 forms the bottom of the weld below the base 12a of rail 12. The weld hardened metal fills the trough of the insert and extends across the entire end of the rail. The weld usually extends above the rail's head 12c. Due to the shape of the cavity 20 in shoe 18 and 18a, as previously described in connection with FIG. 2 and as shown in FIG. 3, the width of the weld varies from bottom to top, generally following the contour of the rail, except that it is wider, to insure proper weld fusion along the entire periphery of the edges of the rails.

After the welding is completed the weld metal above the rail head and along the side of the rail with which a train wheel is to come in contact, is ground away. The weld portions which are typically removed, are crosshatched in FIG. 6 and designated by numeral 50.

In one embodiment which was actually reduced to practice, a weld was produced which varied in width from a width of 6¾ inches at the bases of the rails down to a width of 3⅜ inches just below the heads of the rails. Thereafter the width was maintained at 3⅜ inches along the height of the heads of the rails.

The source of power as well as the electrode feed drive unit are commercially available. In the particular embodiment, the power source, with a control unit and the electrode feed drive were units, manufactured by Hobart Brothers Company of Troy, Ohio. The voltage provided by the power source was about 32 volts. After the arcing was stabilized as the slag bath was formed and some molten metal was present at the bottom of the weld on insert 35, the current stabilized at about 1100 amperes, at an electrode feed rate of about 75 inches per minute. As the welding process proceeded to the weld portion of the reduced width, the equipment maintained the current at about 1100 amperes, while automatically increasing the feed rate to about 110 inches per minute. When the slag bath rose above the heads of the rails, the feed rate increased automatically to about 180 inches per minute.

In the particular example, two Hobart power sources, Model RC-750, were connected in parallel, thereby providing a steady state maximum current output of 1500 A. With such equipment some operator involvement was required to adjust the feed rate so as to decrease the current output from 1800 A, which is above the rated output of the combined sources, to the stabilized state of 1100 A. It is believed, however, that with a power source of a higher current rating, e.g., 2000 A-2500 A, the electrode feed rate would be automatically adjusted to maintain the current at a desired level, e.g., 1100 A, without operator involvement.

In the particular embodiment the structure 45 consisted of a plate of low carbon steel, such as AISI-SAE 1010, or a combination of this type steel and selected alloys, e.g. high carbon steel AISI-SAE 1080. As to the guide tubes, they were of mild steel, available from various sources, including Hobart. As to the electrode they were solid mold steel wires, such as AWS-E705-3.

It should be stressed that the electrodes, guides and the plate may be made of different metals from those mentioned. The choice of materials in the structure 45 depends on several factors and their order of importance, such as the desired matching of the weld hardness to that of the rails, the desired matching of the weld matter to that of the rails, such as alloy matching, as well as the desired microstructure of the weld. For example, the electrodes may be of 2¼ chromiom 1 molybdenum.

Figures 7, 8A:
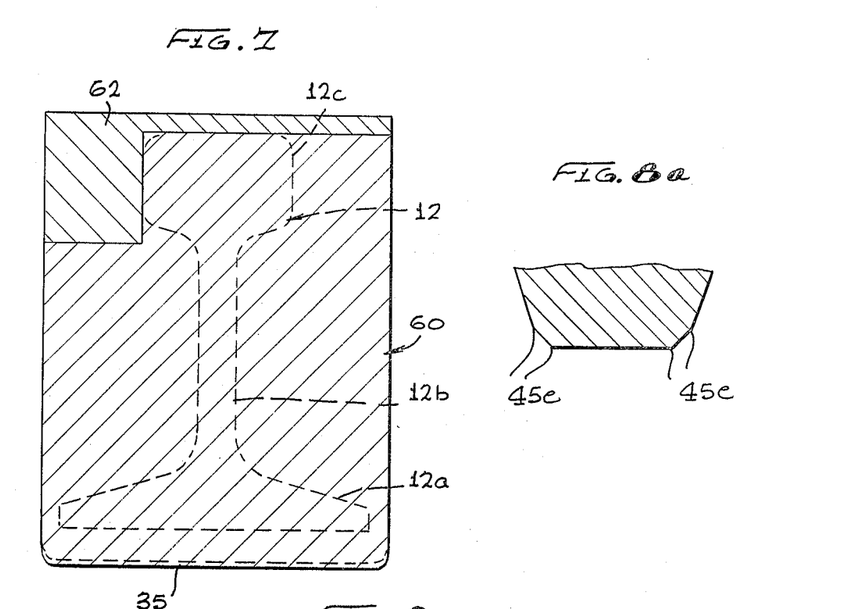
FIG. 8a is a view along lines 8a—8a in FIG. 8.

It should be appreciated that if desired the weld may be produced with a constant width, equal to that of the width at the bases of the rails. Such a weld is designated by numeral 60 in FIG. 7. It is, of course, apparent that more weld metal is used up in such a weld. Also, the amount of hardened metal 62 which has to be removed, after the weld is finished to provide sufficient clearance for a train wheel to ride across the weld, is greater than when a weld contoured to follow the rail contour, such as is shown in FIG. 6, is produced. However, in some field applications, particularly with personnel who are not sufficiently trained in the welding process, producing a weld such as is shown in FIG. 7 may result in a greater probability that the finished weld would be of high quality.

When providing a weld of uniform width the guide structure may be more uniform in width than that shown in FIG. 5. In fact, a structure with equally spaced electrodes along the entire weld depth may be used. Furthermore, more than two electrodes may be used to provide uniform heat and filler metal across the entire weld width.

Figure 8:
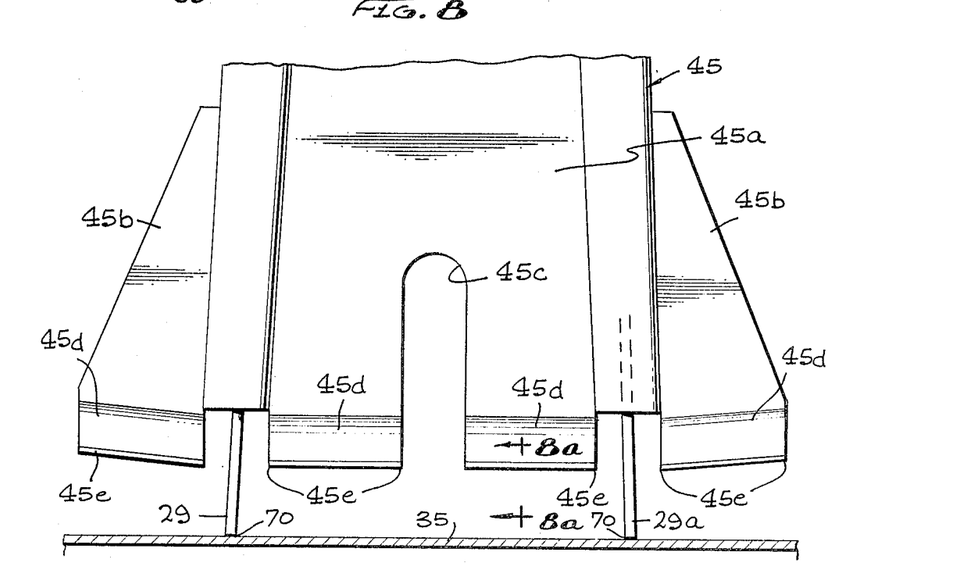
FIG. 8 is a side view of another preferred embodiment of the guide tube structure.

Attention is now directed to FIG. 8 which is a cross sectional view of insert 35 and a side view of the bottom portion of structure 45, which is shown in more detail than in FIG. 5. In practice, the bottom of the structure 45 is not flat. Rather, the guides 28 and 28a are recessed to terminate at points above plate 45a and the wings 45b. In addition, a deep recess 45c is formed in plate 45a and pyramid-shaped parts, designated 45d, extend downwardly toward the inset 35. Their side view is shown in FIG. 8a. These metallic parts are purposely formed with sharp corners 45e.

In operation, the electrodes 29 and 29a extend to be in contact or practically in contact with the insert 35.

When power is applied, since the electrodes are at +V and the insert at ground, significant arcing, designated by numeral 70, occurs between the electrodes and the insert. As a result, some of the electrode metal melts. In fact, some molten metal gets spewed back towards the structure 45, and then back toward the insert 35. The reason for the guides 28 and 28a being sufficiently recessed at the bottom of the structure is to prevent some spewed-back molten metal from reaching the guide tubes and fusing thereat. Such fusion would prevent further electrode feeding. Also the recessing of the guide tubes is required to provide proper electrical stick out.

Also, due to the significant arcing at the electrode tips at the insert, some arcs propagate upwardly towards the structure 45. As is appreciated, such arcs tends to propagate to sharp edges. It is for this reason that sharp edges 45e are provided. As a result, of the arcing at these edges, some of the metal at edges 45e of parts 45d tends to melt, gradually rounding out the sharp edges. The molten metal drips toward insert 35. The important point is the fact that initially molten metal is provided not only by the melting electrodes, which are at two specific points on insert 35, but rather across the entire surface of insert 35, thereby providing a relatively uniform distribution of molten metal along the insert 35, as the welding process starts. As a result, the flux melts uniformly to form a slag bath of uniform temperature. This aspect contributes greatly to the final quality of the weld. Although herebefore parts 45d are shown as separate metallic parts, in practice plate 45a and wings 45b may be machined with pyramid shaped ends, in lieu of the separate parts 45d.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. For use in welding ends of spaced-apart railroad rails by an electroslag welding process wherein mold-forming means are used to form a mold cavity, said mold-forming means including a pair of oppositely-positionable shoes which are contoured to be tightly clampable to the sides of said rails and further contoured to form sides of said weld cavity which includes the space between the ends of said spaced apart rails, a bottom member for forming the bottom of said well cavity, comprising:

a metal block defining a recess at the top thereof;
   heat insulating means in said recess; and
   a metallic insert lying on said heat insulating means and extending across the width of said cavity with said rails lying on said insert, said insert having a recess which forms the bottom of said weld cavity, the region immediately above said insert being free of obstruction to the insertion of a welding electrode so its tip can substantially touch said insert to form an arc between said electrode and said insert.

2. For use in welding ends of spaced-apart railroad rails as recited in claim 1 where said rails and said metallic insert are both constructed of steel, so the insert can melt and become part of the weld.

3. For use in welding ends of spaced-apart railroad rails as recited in claim 1 wherein said insert is heat insulated from said metal block by said heat insulating means only about said recess, with the rest of the insert being in contact with said metal block.

4. An electroslag welding process of the type wherein spaced apart metal parts are welded together by a metal weld, formed in weld cavity, into which filler metal is continuously provided, and wherein a slag bath is present and as a result of electrical power, applied between said filler metal which is in contact with said slag bath and the weld mold, the slag bath is maintained at a high temperature so that the filler metal, in contact therewith, melts and flows downwardly in said cavity, and as it cools it hardens to form said weld the steps comprising:

positioning in said weld cavity a guide tube structure, through which at least one metal electrode is continuously feedable into said cavity;
   providing a bottom block forming the bottom part of said mold, said bottom block including a trough-shaped metallic insert extending across the width of the cavity and which is substantially heat insulated from the bottom block; and
   applying electrical power between said electrode and said metal insert and establishing an arc between them, and continuously feeding said electrode into said cavity, whereby said insert and portions of the bottom structure melt to form a layer of molten metal at the cavity bottom of substantially uniform temperature.

5. An electroslag welding process of the type as recited in claim 4 wherein upon the initiation of said process preselected flux is poured into said cavity, flowing to the bottom thereof, said flux when coming in contact with the molten metal of substantially uniform temperature melts to form a slag bath of uniform temperature.

6. In modified electroslag welding process for welding the ends of adjacently spaced railroad rails, the steps comprising:

providing a mold-forming structure for said weld, which forms a weld cavity, the structure including a bottom block defining a trough, a trough-shaped metallic insert, and heat insulating means in the trough of said bottom block, said heat insulating means substantially heat insulating said metallic insert about its trough shape from said bottom block;
   providing an electrode guide structure comprising at least two spaced apart guide tubes extending in downward-divergent directions to guide continuously fed consumable metal electrodes, with the guide tubes and electrodes forming filler metal;
   positioning said guide structure in the weld cavity, with the ends of said electrodes being substantially in contact with said metallic insert;
   applying electrical power with selected parameters between said electrodes and said metallic insert and the mold-forming structure, whereby arcing is initiated between the electrodes and the metallic insert, causing portions of the electrodes' ends, the bottom of said electrode guide structure and said metallic insert to melt to form a substantially uniform layer of molten metal at the bottom of the weld cavity;
   pouring preselected flux to the bottom of the weld cavity, said flux forming a slag bath as a result of flux melting, said slag bath floating on the molten metal; and
   continuously feeding said electrodes into the slag bath while said electrical power is continuously applied, until molten metal reaches a level at least equal to the top of the heads of the rails;

said electrode guide structure including wing forming metallic plates extending adjacent to the guide tubes where the spacing between them is a maximum.

7. For use in welding adjacent ends of railroad rails under field conditions as recited in claim 6 wherein said wing-forming metallic plates extend down to level below those of the guide tubes.

8. For use in welding adjacent ends of railroad rails under field conditions as recited in claim 7 wherein said structure further includes metallic matter, of preselected properties at least between said flared, spaced apart guide tubes.

9. For use in welding adjacent ends of railroad rails under field conditions as recited in claim 8 wherein said metallic matter between said guide tubes, defines a recess extending upwardly from the bottom of said structure.

10. In a modified electroslag welding process for welding the ends of adjacently spaced railroad rails, the steps comprising:
providing a mold-forming structure for said weld, which forms a weld cavity, the structure including a bottom block defining a trough, a trough-shaped metallic insert, and heat insulating means in the trough of said bottom block, said heat insulating means substantially heat insulating said metallic insert about its trough shape from said bottom block;
providing an electrode guide structure comprising at least two spaced-apart guide tubes designed extending in downward-divergent directions to guide continuously fed consumable metal electrodes, with the guide tubes and electrodes forming filler metal;
positioning said guide structure in the weld cavity, with the ends of said electrodes being substantially in contact with said metallic insert;
applying electrical power with selected parameters between said electrodes and said metallic insert and the mold-forming structure, whereby arcing is initiated between the electrodes and the metallic insert, causing portions of the electrodes' ends, the bottom of said electrode guide structure and said metallic insert to melt to form a substantially uniform layer of molten metal at the bottom of the weld cavity;
pouring preselected flux to the bottom of the weld cavity, said flux forming a slag bath as a result of flux melting, said slag bath floating on the molten metal; and
continuously feeding said electrodes into the slag bath while said electrical power is continuously applied, until molten metal reaches a level at least equal to the top of the heads of the rails;
said electrode guide structure including metallic matter with sharp edges at the bottom of said structure below the ends of said guide tubes, where the space between them is the greatest.

11. For use in welding adjacent ends of railroad rails under field conditions as recited in claim 10 wherein said structure further includes metallic matter, of preselected properties at least between said flared, spaced apart guide tubes.

12. For use in welding adjacent ends of railroad rails under field conditions as recited in claim 11 wherein said metallic matter comprises at least two metallic plates with different properties.

13. For use in welding adjacent ends of railroad rails under field conditions as recited in claim 12 wherein said structure includes wing forming metalic plates extending adjacent the guide tubes where the spacing between them is a maximum.

14. For use in welding adjacent ends of railroad rails under field conditions as recited in claim 11 wherein said structure includes wing forming metallic plates extending adjacent the guide tubes where the spacing between them is a maximum.

15. For use in welding adjacent ends of railroad rails under field conditions as recited in claim 14 wherein said metallic matter comprises at least two metallic plates with different properties.

16. A method for welding together the ends of two rails, comprising:
holding the rails aligned but spaced, and enclosing the bottom and sides of the space between them with a mold-forming structure to form a weld cavity, including positioning a bottom member under the rails, the bottom member including a metallic insert forming a depression at the bottom of the cavity and forming insert edges on which the ends of said rails lie;
the bottom member also including thermal insulation under the insert;
applying electric power between an electrode having a tip adjacent to said insert and said insert to establish an arc between them, and continuously feeding said electrode into said weld cavity while continuing to apply said power to said electrode, until molten metal reaches a level at least equal to the top of the heads of the rails, including welding at least part of the edges of said insert to said rails;
removing all of said mold-forming structure except said insert from around the ends of said rails, at least the recess-forming portion of said insert being allowed to remain welded to said rails.

* * * * *